United States Patent [19]

Seale-Finch

[11] 3,918,093

[45] Nov. 4, 1975

[54] TAPE DRIVING MECHANISM FOR TAPE RECORDERS WITH SOLENOID OPERATED CLUTCH PULLEYS

[75] Inventor: Vernon Seale-Finch, Reading, England

[73] Assignee: The Plessey Company Limited, Zug, Switzerland

[22] Filed: July 9, 1973

[21] Appl. No.: 377,462

[30] Foreign Application Priority Data

July 14, 1972 United Kingdom .............. 33058/72

[52] U.S. Cl. .................... 360/96; 242/192; 310/92; 360/105

[51] Int. Cl.² ...................... G11B 5/54; H02K 49/10

[58] Field of Search ............................... 360/93–96, 360/105; 242/192; 310/76, 78, 92, 103

[56] References Cited

UNITED STATES PATENTS

| | | | |
|---|---|---|---|
| 2,147,204 | 2/1939 | Laird | 310/92 |
| 2,271,207 | 1/1942 | Rhein | 310/78 |
| 2,999,573 | 9/1961 | Maurice | 310/92 |
| 3,667,701 | 6/1972 | Blum | 242/192 |
| 3,751,042 | 8/1973 | Platt | 360/96 |
| 3,754,765 | 8/1973 | Tanaka | 360/96 |
| 3,764,089 | 10/1973 | Yoshida | 360/96 |

*Primary Examiner*—Bernard Konick
*Assistant Examiner*—Jay P. Lucas
*Attorney, Agent, or Firm*—Scrivener Parker Scrivener & Clarke

[57] ABSTRACT

Cassette tape recorder comprising contra-rotating drive pulleys having coupled thereto spindles on which the spools of the cassette are located, coupling of the spindles to the drive pulleys being effected through a pair of solenoid operated clutches operable for selecting fast forward tape drive or fast re-wind functions. The magnetic head and pinch roller assembly are mounted on a carrier arm that is drawn to operating position by the action of another solenoid.

9 Claims, 4 Drawing Figures

TAPE DRIVING MECHANISM FOR TAPE RECORDERS WITH SOLENOID OPERATED CLUTCH PULLEYS

Figure 1A:
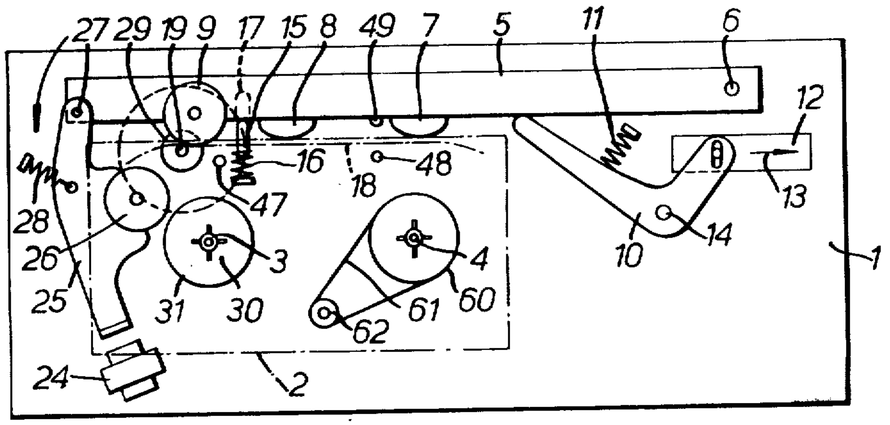

This invention relates to tape recording and play back apparatus and more especially it relates to such apparatus for use with tape cassettes.

Tape recording and play back apparatus comprises a magnetic head assembly for recording, play back and erase purposes, a capstan having associated with it a fly wheel for driving the tape at constant speed during recording and playback operations and means for fast wind or re-wind of the tape. For tape cassette applications it is necessary to locate the cassette so that each of its two spools engages with a splined driving spindle. It is also necessary to advance into the cassette, means for driving the tape, such as a capstan and pinch wheel assembly and also to move into the cassette a magnetic record/play back and erase head assembly.

It is one aim of the present invention to provide a simple and particularly convenient tape cassette recording and play back apparatus.

According to one aspect of the present invention tape recording and/or play back apparatus comprises a pair of splined spindles spaced apart so as to receive a tape cassette, drive pulleys disposed coaxially with respect to the spindles one for each spindle and coupled via transmission means continuously to receive, in operation of the apparatus driving torque from a motor and two solenoid operated clutches one for each pulley for mechanically coupling one or other of the drive pulleys in driving engagement with its associated spindle to effect fast tape wind or re-wind in accordance with which of the said clutches is engaged.

The clutches may have toothed or serrated plates.

The clutches may comprise an extension of the splined spindle to which one annular clutch plate member is connected and disposed concentrically with respect to another annular clutch plate member, opposing contact faces of the said members being toothed to facilitate torque transmission therebetween when they are brought together into driving engagement by operation of a solenoid.

In accordance with a further aspect of the invention, in order to effect drive of the tape for record or play back purposes, a pinch roller which conveniently is supported on a carrier arm carrying a magnetic head assembly, is brought into engagement with the tape by operation of a solenoid such that the tape is pinched between the said roller and a motor driven capstan having coaxially connected thereto a fly-wheel, the axis of the pinch roller being fixed with respect to the axis of the capstan when these parts are brought into engagement. Since the pinch roller and the capstan are positionally fixed with respect one to the other and since the magnetic head assembly supported by the carrier arm is also fixed, an arrangement is afforded which provides for minimum distortion due to wow and flutter.

In accordance with another aspect of the invention in order to facilitate take-up of the tape, which is driven past the magnetic head by the pinch roller, an idler roller is provided movable by solenoid operation to a position whereat torque is transmitted by the idler roller from the capstan shaft through a slipping friction clutch to an appropriate one of the splined spindles with which it is associated, the slipping friction clutch being disposed coaxially with respect to the said appropriate splined spindle. It will be appreciated therefore that the take-up spool spindle is driven on the one hand through a coaxially disposed slipping friction clutch from the capstan and fly wheel for take up purposes and on the other hand for fast wind and re-wind it is driven through a toothed clutch which is solenoid operated.

In accordance with yet a further feature of the invention interlocking, i.e., the inhibition of one or more operations or functions in accordance with the operation or inoperation of a further function, is effected electrically under the control of logic circuits. This is made possible because the solenoid wind, re-wind, record and play back functions are selected by solenoid operation. It will be appreciated that the control of the solenoids by means of logic circuits is a relatively simple task for those skilled in the art.

By arranging that the apparatus is supported on a solidly constructed base which might conveniently be fabricated from cast aluminum alloy, the principle mechanical parts may be precisely located with respect to one another by the simple expedience of machining the base to suitably close tolerances.

In accordance with yet another feature of the invention in order to load a tape cassette into the apparatus the cassette is inserted into a pocket of a carrier door which is hinged to move longitudinally so that the splined spindles are engaged one after the other by complementary holes in the tape cassette spools as the carrier door is closed. This arrangement has the advantage that the position of the cassette, with respect to guide pins and the capstan of the apparatus, is precisely defined in a direction orthogonal to the longitudinal axis of the cassette and hence risk of tape damage or tape misalignment during a cassette loading operation is minimised.

In order to facilitate easy accessibility for maintenance of the apparatus and yet to protect the apparatus during normal use, it may be arranged that the cassette carrier door normally opens to a first position whereat the cassette may be inserted but whereat vital parts of the apparatus are inaccessible, the door being openable to a second position consequent upon the actuation of a hidden catch such that the door can be fully opened to permit access for servicing.

According to still a further aspect of the invention one of the guide pins for defining the position of the tape with respect to the magnetic heads when the cassette is located in the apparatus, may be a peg which is at least partly translucent to serve as a light guide for use in combination with a light source in order that a translucent lead-in of the tape may be sensed for controlling operation of the apparatus.

In one contemplated embodiment the peg may comprise a light emitting diode and light from the diode may be sensed by a light sensitive element conveniently positioned on the carrier arm which supports the heads.

Figure 1B:
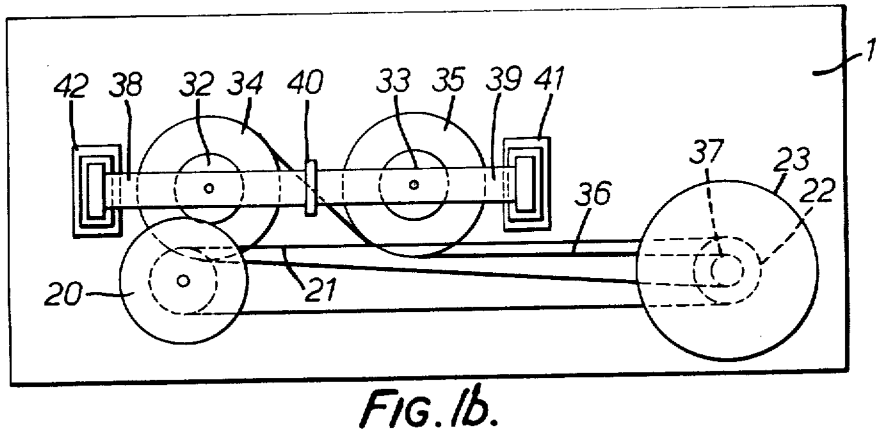
Figure 1C:
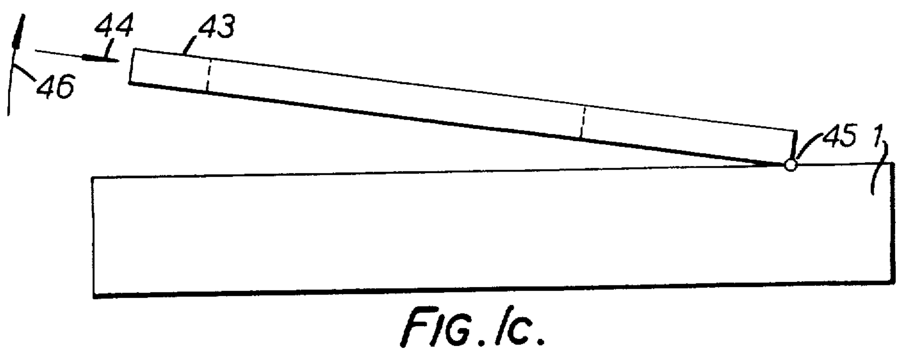
Figure 2:
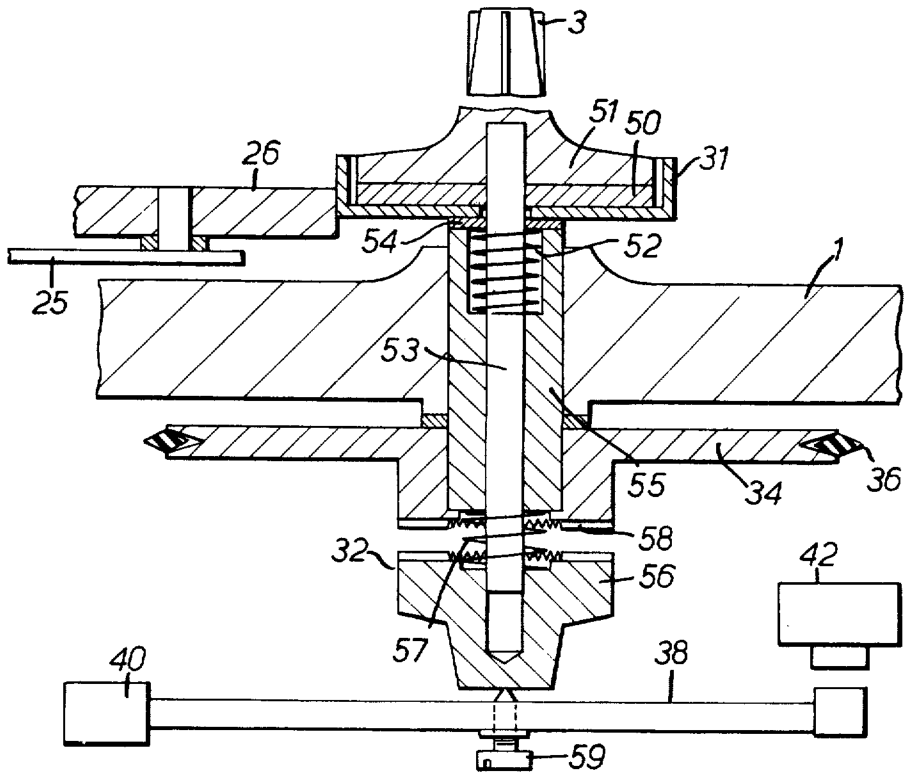

Various other aspects of the invention will become apparent and the invention will be more readily understood from the accompanying description of an exemplary embodiment of the invention wherein reference is made to the accompanying drawings in which:

FIG. 1*a* is a generally schematic plan view of tape cassette record/play-back apparatus mounted on a base, FIG. 1*b* is a generally schematic rear view of the cassette record/playback apparatus, FIG. 1*c* is a generally schematic side view of the base showing a cassette carrier door, and FIG. 2 is a generally schematic sectional side elevation of a clutch assembly according to one feature of the invention.

Referring now to the drawings, wherein corresponding parts of the FIGS. 1*a*, 1*b* and 1*c* bear the same numerical designations, the apparatus comprises a cast alloy base 1 suitably milled and drilled to define fixing locations for the various parts mounted thereon. In order to locate on the base 1 a cassette the position of which is shown generally by broken line 2, a pair of splined spindles 3 and 4 are provided mounted for rotation with respect to the base 1. In order to enable a cassette to be located on the spindles 3 and 4, an arm 5 pivoted on a pin 6 secured to the base 1, carrying an erase head 7, a record/play back head 8 and a pinch roller 9, is moved about the pin 6 to a retracted position. Movement of the arm to this position is effected by means of a cranked lever 10 biased against the arm by a spring shown schematically at 11, which consequent upon movement of an actuator slider 12 in the direction of arrow 13, rotates about a shaft 14 thereby to move the arm 5 away from the region whereat the cassette is located. The actuator slider 12 serves also to unlock a catch (not shown) of a door 43 in which the cassette is rested. Restoration of the arm 5 to an unretracted position is prevented by means of a hit and miss stop pin 15 carried on the base 1 and normally biased by means of a spring 16 against a side face of the arm adjacent a hole 17 drilled therein. When the cassette is located on the splined spindles 3 and 4 the stop pin 15 is pushed down by the cassette, or by the door 43 in which the cassette is rested so that it pops into the hole 17 in the arm 5 enabling the arm to move forward to the unrestricted position whereat the heads 7 and 8 rest gently in contact with the tape 18 which is shown schematically by a broken line. Fast forward and reverse drive may be effected in this position.

During record and play back operations, the tape is driven by means of a capstan 19 between which and the pinch roller 9 it is squeezed. The capstan extends through the base 1 in which it is journalled and on its end remote from the pinch roller 9 there is fitted a flywheel 20 which is driven by a flat polyester belt 21 from one shaft surface 22 of a motor 23. When record or play back operations are selected a solenoid 24 is energised and solenoid actuating arm 25 on which an idler roller 26 is mounted and which is also coupled through pin 27 to the arm 5, is drawn forward against the restraining influence of a spring 28 shown schematically. As the solenoid actuating arm moves forward, the arm 5 on which the heads and pinch roller are mounted moves forward such that the pinch roller cooperates with the capstan 19 and engages the tape for driving purposes. At the same time, the idler roller 26 engages a larger diameter shoulder 29 of the capstan and it engages also a rim 31 of clutch assembly 30 which is mounted on the spindle 3 so that torque is transmitted from the capstan 19 to the spindle 3. The clutch, which will later be described in greater detail with reference to FIG. 2, is designed so that it slips in operation, the gearing being so arranged that the tape fed between the pinch roller 9 and the capstan 19 is taken up and stored on the spool of the cassette which is engaged with the spindle 3.

In order to facilitate fast forward or fast reverse drive of spindles 3 or 4 they are selectively connected through clutches 32 and 33, to pulleys 34 and 35 which are driven by a V-belt 36 from a shaft 47 of the motor 23. One or other of the clutches 32, 33 are selected by operation of one or other of a pair of actuator levers 38, 39 which are hinged about a point 40. The actuator lever 39 is operated by energizing solenoid 41 and the actuator lever 38 is operated by energising solenoid 42.

It will be readily appreciated that since drive of the tape for record and play back purposes is selected simply by means of solenoid 24 and that since fast forward or reverse drive is selected by the solenoids 41 or 42 that operation of the apparatus is easily controlled by means of logic circuitry and that the essential interlocking functions necessary to avoid simultaneous selection of incompatible operations may be effected by means of this logic circuitry the design of which may be easily determined by those skilled in the art.

In FIG. 1*c* a hinged door 43 is shown into which the cassette is inserted from the direction of the arrow 44. The cassette and door are thus movable about a pivot point 45 in the direction of arrow 46. It can therefore be seen that the cassette may be precisely located in a direction orthogonal to its longitudinal axis, which has the advantage that the tape may be precisely located with respect to guide pins 47 and 48 and also with respect to the capstan 19. Any risk that the tape 18 may become damaged or fall the wrong side of the capstan is therefore obviated or at least reduced.

The guide pin 48 may comprise a transparent light guide through which light is passed from a source (not shown) positioned on the opposite side of the board to the side at which the cassette is located, or alternatively the pin 48 may include a light emitting diode. The purpose of this arrangement is to facilitate end of tape detection by means of passing light from the guide pin 48 through the tape to a light sensitive detector 49 mounted conveniently on the arm 5. in order to open the door 43 a latch (not shown) is provided operable by means of the actuator slider 12 such that the door is released to a first position whereat the cassette may be inserted, a further concealed latch being operable in order to enable the door 43 to be fully opened to afford access to the various parts of the apparatus. It will therefore be appreciated that when such apparatus is provided for a domestic cassette machine such an arrangement is especially advantageous.

Reference will now be made to FIG. 2 wherein parts which correspond to those shown also in FIG. 1 bear the same numerical designations. FIG. 2 shows in greater detain the friction clutch assembly for facilitating tape take-up and the construction of the toothed clutch by means of which fast drive is effected. Referring firstly to the operation of the slipping friction clutch, when the solenoid 24 is energised the idler wheel 26 moves into engagement with the rim 31 and torque is transmitted through a felt pad 50 to the splined splindle 3. The splined spindle 3 extends down to a discoidal part 51 which is urged by the influence of spring 52 into contact with the felt pad 50. The spring 52 may be omitted the parts being assembled so that the pad 50 is suitably compressed. It can be seen therefore that the rim 31 may slip during operation of the apparatus with respect to the spindle 3. A shaft 53 of the splined spindle 3 is arranged to extend through a bearing washer 54 into a sleeve 55 mounted rigidly in the base 1. At the other end of the spindle 53 there is provided a toothed driving plate 56 of the clutch 32 which is secured for driving purposes to the spindle 53 but which may move axially of the spindle against the influence of the spring 57. Mounted for rotation on the sleeve 55 there is provided the V-pulley 34 which is driven by means of the V-belt 36. When fast drive is selected the solenoid 42 is energised to pull down the actuating lever 38 such that the toothed plate 56 co-operates to receive driving torque from a complementary toothed annular surface 58 of the pulley 34.

In order to provide some means of adjustment, the actuating lever is provided with an adjustment screw 59 by means of which the space between the lever 38 and the disc 56 of the toothed clutch 32 may be adjusted. Although the rim 31 associated with the spindle 3 is coupled thereto through a friction clutch the spindle 4 is directly coupled to its associated rim 60 which is provided with a groove for receiving a V-belt 61 which is utilized to drive a footage counter 62. The toothed clutch arrangement as shown in FIG. 1*b* and designated 33 operates in an exactly analogous manner to the clutch 32.

It will be appreciated that the drawings are generally schematic and not to scale and therefore the gearing between various parts and pulleys shown may be different from the impression given by the drawing. Various modifications may be made to the arrangement described without departing from the scope of the invention. In one contemplated modification of the arrangement shown it may be arranged that the arm 5 is pivoted substantially in the centre thereof and two sets of magnetic heads provided one each side of the pivot point. By means of this arrangement it is possible for recording and play back to be achieved in both drive directions, one or the other sets of heads being selected accordingly. It will be appreciated that with this arrangement two separate solenoids are required, operating one at each end of the arm such that the arm is arranged to tilt one way or the other about the central pivot point.

What we claim is:

1. Tape recording and/or playback apparatus comprising a pair of splined spindles spaced apart so as to receive a tape cassette, drive pulleys disposed coaxially with respect to the spindles, one for each spindle, transmission means via which the spindles are coupled continuously to receive, in operation of the apparatus driving torque from a motor and two solenoid operated face plate clutches one for each pulley, for mechanically coupling one or other of the drive pulleys coaxially in driving engagement with its associated spindle so as to effect fast tape wind or re-wind in accordance with which one of the said clutches is engaged, said apparatus also comprising a pinch roller, a magnetic head assembly, a carrier arm supporting the pinch roller and magnetic head assembly in spaced apart relationship, a further solenoid operatively associated with the carrier arm, a pivot about which the carrier arm is moved consequent upon operation of the solenoid, the magnetic head assembly and pinch roller being arranged on a common radial line through the pivot and to one side of the pivot, a capstan, a flywheel coupled coaxially with the capstan, and a motor for driving the capstan, the arrangement being such that when the carrier arm is moved consequent upon operation of the further solenoid the magnetic head assembly is brought into contact with magnetic tape carried in a tape cassette and the pinch roller is moved so that the tape is pinched for driving purposes between the pinch roller and the capstan, the axis of the pinch roller being fixed with respect to the axis of the capstan when these parts are brought together for driving the tape.

2. Tape recording and/or playback apparatus as claimed in claim 1 comprising an idler roller, a carrier arm movable by means of the further solenoid on which the idler roller is supported, a hub co-axial with the capstan and a slipping friction face plate clutch through which torque is transmitted to one or other of the splined spindles with which it is associated for tape take-up purposes from the hub via the idler wheel consequent upon operation of the further solenoid.

3. Tape recording and/or play back apparatus as claimed in claim 1 wherein the slipping friction clutch is disposed coaxially with respect to the appropriate splined spindle.

4. Tape recording and/or play back apparatus as claimed in claim 3, wherein the solenoid operated clutches comprise an extension of the splined spindles with which they are associated and to each of which one annular clutch plate member is connected and disposed concentrically with respect to another clutch plate member, opposing contact faces of the said members being toothed to facilitate torque transmission therebetween when they are brought together into driving engagement by solenoid operation.

5. Tape recording and/or play back apparatus as claimed in claim 3, wherein solenoid operation is controlled by means of logic circuits.

6. Tape recording and/or play back apparatus as claimed in claim 3 wherein the drive pulleys and carrier arm are supported on a cast aluminum alloy base.

7. Tape recording and/or play back apparatus as claimed in claim 3, wherein a carrier door is provided including a pocket for receiving a tape cassette, the carrier door being hinged to move longitudinally so that the splined spindles are engaged one after the other by tape cassette spools of a tape cassette as the carrier door holding the cassette is moved to a closed position.

8. Tape recording and/or play back apparatus as claimed in claim 3, comprising guide pins for defining the position of the tape with respect to a magnetic head assembly when the cassette is located in the apparatus wherein one of the guide pins comprises a peg which is at least partly translucent and serves as a light guide for use in combination with a light source for detecting a translucent lead-in of the tape.

9. Tape recording and/or play back apparatus as claimed in claim 8, wherein the peg comprises a light emitting diode, light from the diode being detected by a light sensitive element positioned on the carrier arm supporting the magnetic head assembly.

* * * * *